United States Patent
Thomas et al.

(10) Patent No.: US 11,712,754 B2
(45) Date of Patent: Aug. 1, 2023

(54) DEVICE AND METHOD FOR LASER-BASED SEPARATION OF A TRANSPARENT, BRITTLE WORKPIECE

(71) Applicant: SCHOTT AG, Mainz (DE)

(72) Inventors: Jens Ulrich Thomas, Stralsund (DE); Frank-Thomas Lentes, Bingen (DE); Andreas Ortner, Gau-Algesheim (DE)

(73) Assignee: SCHOTT AG, Mainz (DE)

( * ) Notice: Subject to any disclaimer, the term of this patent is extended or adjusted under 35 U.S.C. 154(b) by 146 days.

(21) Appl. No.: 16/600,848

(22) Filed: Oct. 14, 2019

(65) Prior Publication Data

US 2020/0039005 A1    Feb. 6, 2020

Related U.S. Application Data

(63) Continuation of application No. PCT/EP2018/058981, filed on Apr. 9, 2018.

(51) Int. Cl.
*B23K 26/38* (2014.01)
*B23K 26/0622* (2014.01)
(Continued)

(52) U.S. Cl.
CPC .......... *B23K 26/38* (2013.01); *B23K 26/0006* (2013.01); *B23K 26/0622* (2015.10); *B23K 26/53* (2015.10); *B23K 26/0652* (2013.01)

(58) Field of Classification Search
CPC .... B23K 26/38; B23K 26/0622; B23K 26/53; B23K 26/0006; B23K 26/0652;
(Continued)

(56) References Cited

U.S. PATENT DOCUMENTS 10,421,683 B2   9/2019  Schillinger et al.
2006/0091283 A1  5/2006  Acker
(Continued)

FOREIGN PATENT DOCUMENTS

CN   1369728   9/2002
CN   1665637   9/2005
(Continued)

OTHER PUBLICATIONS

Written Opinion dated Jul. 25, 2018 in corresponding PCT International Patent Application No. PCT/EP2018/058981, 6 pages.
(Continued)

*Primary Examiner* — Geoffrey S Evans
(74) *Attorney, Agent, or Firm* — Ruggiero McAllister & McMahon LLC

(57) ABSTRACT

The present disclosure provides a device and a method for laser-based separation of a transparent, brittle workpiece, comprising a laser that emits a laser beam having an intensity ($I_L$) along an optical axis (P), and an optical device. The optical device has at least one one-piece double axicon. The double axicon has an entrance surface and the optical device has an exit surface. The entrance surface is such that in the double axicon, a ring beam is formed. The intensity ($I_L$) in the double axicon is lower than the threshold intensity ($I_S$) of the material of the double axicon. The exit surface is such that a line focus having a maximum intensity ($I_{max}$) and a length ($L_T$) is generated in the direction of the laser beam behind the exit.

14 Claims, 5 Drawing Sheets

(51) Int. Cl.
  *B23K 26/00* (2014.01)
  *B23K 26/53* (2014.01)
  *B23K 26/06* (2014.01)

(58) Field of Classification Search
  CPC .............. B23K 26/0823; B23K 26/0648;
        B23K 26/57; C03B 33/0222; G03F 1/84
  USPC .......... 219/121.6, 121.66, 121.65, 121.61;
        428/195.1, 131; 355/67, 71; 65/501;
        359/9, 577, 900, 558, 565
  See application file for complete search history.

(56) References Cited

U.S. PATENT DOCUMENTS

| 2014/0004318 | A1 | 1/2014 | Bovatsek | |
| 2015/0166393 | A1* | 6/2015 | Marjanovic | B23K 26/57 |
| | | | | 428/131 |
| 2015/0293460 | A1* | 10/2015 | Takehisa | G03F 1/84 |
| | | | | 355/67 |
| 2015/0299018 | A1 | 10/2015 | Bhuyan | |
| 2016/0089749 | A1* | 3/2016 | Mori | G02B 27/0025 |
| | | | | 219/121.75 |
| 2017/0066079 | A1* | 3/2017 | Reisse | B23K 26/16 |
| 2017/0157700 | A1 | 6/2017 | Böhme et al. | |
| 2018/0345419 | A1* | 12/2018 | Mikutis | B23K 26/0652 |

FOREIGN PATENT DOCUMENTS

| CN | 202393973 | 8/2012 |
| CN | 102901463 | 1/2013 |
| CN | 104849779 | 8/2015 |
| CN | 104968620 | 10/2015 |
| CN | 205048362 | 2/2016 |
| CN | 106029588 | 10/2016 |
| CN | 106560269 | 4/2017 |
| DE | 10322375 | 12/2004 |
| DE | 102007018400 | 10/2008 |
| DE | 102014213775 | 1/2016 |
| EP | 2754524 | 7/2014 |
| WO | 2004/102230 | 11/2004 |

OTHER PUBLICATIONS

International Preliminary Report on Patentability dated Oct. 24, 2019 in corresponding PCT International Patent Application No. PCT/EP2018/058981, 8 pages.
Durnin, "Comparison of Bessel and Gaussian beams", Optics Letters / vol. 13, No. 2, Feb. 1988, pp. 79-80.
Kampmann, "Optical systems for trapping particles in air", Applied Optics, vol. 53, No. 4, Feb. 1, 2014, 13 pp. 777-784.
International Search Report dated Jul. 25, 2018 in corresponding PCT International Patent Application No. PCT/EP2018/058981, 6 pages.
McLeod, "The Axicon: a New Type of Optical Element", J. Opt. Soc. Am. /vol. 44, No. 8, Aug. 1954, pp. 592-597.
Weber et al. "Highly compact imaging using Bessel beams generated by ultraminiaturized multi-micro-axicon systems", J. Opt. Soc. Am. / vol. 29, No. 5, May 2012, pp. 808-816.
Brzobohaty et al., "High quality quasi-Bessel beam generated by round-tip axicon", in: Opt. Ex-press 16 (17), S.12688. (2008), 13 pages.
Jarutis et al., "Focusing of Laguerre-Gaussian beams by axicon", in: Optics Communications 184 (1-4), S. pp. 105-112, (2000).

* cited by examiner

DEVICE AND METHOD FOR LASER-BASED SEPARATION OF A TRANSPARENT, BRITTLE WORKPIECE

CROSS-REFERENCE TO RELATED APPLICATION

The present application is a continuation of International Patent Application No. PCT/EP2018/058981, filed on Apr. 9, 2018, which in turn claims the benefit of German Patent Application No. 10 2017 206 461.7, filed on Apr. 13, 2017, which is herein incorporated by reference.

BACKGROUND OF THE DISCLOSURE

1. Field of the Disclosure

The invention relates to a device for the laser-based separation of a transparent, brittle workpiece. The invention further relates to a method for the laser-based separation of a specified glass element or glass ceramic element.

2. Description of the Related Art

The laser processing of transparent, brittle material, in particular glass or also sapphire, is usually produced by means of suitably shaped ultrashort-pulse laser radiation having an appropriate wavelength, pulse duration, frequency, and power. Usually, with the use of suitable optics, the laser beam is thereby focused not on a single focal point, but rather on a line focus that extends as long as possible and lies in whole or at least in part in the workpiece that is to be processed. Given appropriate properties of the laser radiation in terms of pulse length, pulse energy, and wavelength, the energy of the laser light leads to a line-shaped interaction with the workpiece in the region of the line of focus.

If many such line-shaped zones of damage are arranged next to one another, for example by way of a relative movement of the workpiece that is to be processed with respect to the line focus, then, in the workpiece, there arises a juxtaposition of interacting lines, each at a respective spacing that depends on the repetition rate of the laser and the speed of the relative movement. The interaction can lead to the creation of a microchannel in the workpiece, so that, in the case of a juxtaposition of such channels, the term microperforation, along which a subsequent separation of the workpiece can occur, is also used.

The separation can occur spontaneously ("self-cleaving") either through the residual stresses that exist in the material or through an independent process. Such processes are, for example, the bending of the workpiece or thermal shock separation. In thermal shock separation, targeted local heating of the perforation zones by a flame or a $CO_2$ laser beam, for example, or else targeted heating or targeted cooling of the outer or inner regions of a closed perforation generates stresses in the workpiece, so that the relative expansion and/or the relative shrinkage lead or leads to a separation of the workpiece.

In order to achieve a similar spatial delimitation of the laser radiation over the entire length of the line focus, so-called Bessel beams are ideally used. They consist of a central, bright maximum that is surrounded by weaker rings and, in comparison to the Gaussian beams that are emitted by the laser, they have the great advantage that their radius in the direction of propagation remains constant. They make possible both the processing of a greater depth range and a greater tolerance in terms of the alignment of the workpiece. In addition, they are virtually free of diffraction and have self-healing properties.

The generation of Bessel beams and of a long extended line focus is achieved, among other things, by the use of so-called axicons as beam-forming lenses. The axicon as an optical element was described in 1954 by McLeod (John H. McLeod: *The Axicon: A New Type of Optical Element*. J. Opt. Soc. Am./Vol. 44, No. 8, August 1954). In accordance therewith, an axicon is an optical element that images the light of small point sources on a straight, continuous focal line. McLeod describes various forms of axicons, but highlights the glass cone as the most important axicon.

Cone-shaped axicons have found application in broad fields of technology and medicine.

For example, Weber et al. describe the use of axicons and multi-axicon systems in optical coherence tomography (OCT), in which, among other things, the self-healing properties of the Bessel beams generated by the axicon play a great role (Niklas Weber et al.: *Highly compact imaging using Bessel beams generated by ultraminiaturized multi-micro-axicon systems*. J. Opt. Soc. Am./Vol. 29, No. 5, May 2012).

R. Kampmann et al. describe a device for trapping particles in air, in which a system made up of two axicons is used, the two axicons being fabricated monolithically, that is, in one piece, from PMMA, whereby both axicons have the same cone angle (R. Kampmann et al.: *Optical systems for trapping particles in air*. Applied Optics/Vol. 53, No. 4, February 2014).

EP 2 754 524 A1 describes a method for laser-based processing of a flat substrate in order to separate the substrate into a plurality of parts. In this method, a laser beam of a laser is directed onto the substrate for the processing thereof. Positioned in the beam path of the laser is an optical arrangement, which forms an extended laser beam focal line, a line focus, from the radiated laser beam at the beam output end of the optical arrangement, as viewed along the beam direction. The substrate is positioned relative to the line focus in such a way that, in the interior of the substrate, along an extended portion of the line focus, as viewed in the beam direction, an induced absorption is produced in the material, through which an induced crack formation occurs in the material of the substrate along this extended portion.

As a beam-forming optical element, the optical arrangement has a spherically ground biconvex lens or an axicon.

The line focus for the processing of the workpiece lies here not only in the workpiece that is to be processed, but also in the axicon. If a workpiece that, like the axicon, is made of glass is then to be processed, the energy of the laser beam would be absorbed not only in the glass workpiece, but also in the axicon itself and thereby destroy it.

Known from DE 10 2014 213 775 A1 is a method and a device for the laser-based processing of flat, crystalline substrates, in particular of semiconductor substrates. The optical arrangement has a focusing, planar-convex collimating lens.

SUMMARY OF THE PRESENT DISCLOSURE

The object of the present invention therefore consists in making available a device and a method for the separation of a transparent, brittle workpiece by means of a laser, wherein the device is set up in such a way that it is not destroyed by the laser beam itself and the work involved in adjusting the beam-forming components is minimized.

In accordance therewith, the device has a laser, which emits a laser beam having an intensity $I_L$ along an optical axis, and a beam-forming optical device having a one-piece double axicon.

The double axicon has an entrance surface, which is designed in such a way that, in the double axicon, the laser beam is formed into a ring beam. The advantage of the double axicon lies in the fact that, through the selection of the energy of the laser, the refractive index of the double axicon, and the axicon angle of the entrance surface, the intensity of the laser beam $I_L$ inside of the double axicon can be adjusted to be lower than the threshold intensity of the material of the double axicon, so that the material of the double axicon is not destroyed during passage of the beam.

The exit surface of the optical device, which, in the simplest case, corresponds to the exit surface of the double axicon, is designed in such a way that the ring beam is recombined and a line focus having a maximum intensity $I_{max}$ and a length $L_f$ is formed in the direction of the laser beam behind the exit surface.

The intensity $I_{max}$ is preferably higher than the threshold intensity $I_S$ of the material of the workpiece. The threshold intensity $I_S$ is a material parameter that specifies when nonlinear volume processes take place in a transparent medium and destroy it. Such nonlinear volume processes are, for example, multiphoton ionization and the creation of avalanche ions. The threshold intensity $I_S$ of glasses lies, for example, at about $5\times10^{16}$ W/m². The length $L_f$ of the line focus corresponds to the width of the intensity distribution in the direction of beam propagation at half maximum intensity $I_{max}$.

The optical device is intended to transform the laser beam, which involves a Gaussian beam, preferably into a Bessel beam. However, the generation of a perfect Bessel beam is possible only in theory. In practice, a laser beam that has both a Gaussian fraction and a Bessel fraction is present. This is set forth, in particular, in the publications:

Brzobohatý, Oto; Cižmár, Tormáš; Zemánek, Pavel (2008): High quality quasi-Bessel beam generated by round-tip axicon. In: *Opt. Express* 16 (17), p. 12688.

J. Durnin, J. J. Miceli Jr., J. H. Eberly (1988): Comparison of Bessel and Gaussian beams. In: *Opt. Lett.* 13 (2), pp. 79-80.

Jarutis, V.; Paškauskas, R.; Stabinis, A. (2000): Focusing of Laguerre-Gaussian beams by axicon. In: *Optics Communications* 184 (1-4), pp. 105-112.

A double axicon is understood to be an optical, beam-forming component that has two opposite-lying and mutually centered, conically ground surfaces.

In the scope of the invention, the term "one piece" includes both a monolithic design of the double axicon and a design in which two planar axicons are connected to each other either directly or indirectly via an intermediate element; for example, they are adhesively bonded, cemented, or contact-bonded to each other. The one-piece design has the advantage that the work involved in adjustment is less than in the case of an optical beam-forming device in which all optically active surfaces are assigned to separate components.

A planar axicon is understood by the person skilled in the art to be an axicon that, opposite its conical surface, has a planar surface.

In the present invention, the optical axis extends along the exit direction of the laser beam from the laser and crosses the tips of the entrance surface and exit surface of the double axicon.

The advantage of a double axicon for the generation of the line focus lies in the fact that the line focus for processing of the workpiece is first formed at a distance from the tip of the exit surface of the axicon and not in the axicon itself, as is the case for a single axicon.

In a preferred embodiment, the double axicon is designed as a Galileo axicon.

A Galileo axicon is understood to mean a double axicon that has an inwardly directed conical entrance surface and an outwardly directed conical exit surface. Consequently, the tips of the two conical surfaces point in the beam exit direction of the laser.

The laser beam impinging at the center of the entrance surface of the Galileo axicon is split apart when it passes the entrance surface on account of the law of refraction and re-shaped into a ring beam, the radius of which depends on the axicon angle of the entrance surface, on the refractive index of the double axicon, and on the path that has been traversed by the laser beam in the axicon. The axicon angle is here the angle between the conical surface and the normal line to the cone axis of the conical shape formed by the entrance surface of the double axicon.

When it passes the exit surface of the Galileo axicon, the ring beam is refracted away from the perpendicular line to the exit surface, depending on the axicon angle of the exit surface.

Because the beam that is emitted by the laser involves a Gaussian beam, its intensity decreases radially outward and the intensity maximum lies in the center of the beam. When the beam splits after passing the entrance surface of the Galileo axicon, the intensity maximum therefore lies on the inner side of the ring beam. The result of this is that the line focus of the recombined ring beam has its intensity maximum in the front portion of its intensity distribution along the optical axis. This has the advantage that diffractive beam-forming elements can be utilized for a further beam formation in order to create intensity distributions that depart from the Gaussian-Bessel intensity distribution, for example.

In another preferred embodiment, the double axicon is designed as a Kepler axicon.

A Kepler axicon is understood to mean a double axicon that has two outwardly directed conical surfaces.

In contrast to the case of a Galileo axicon, the laser beam does not split apart when it passes the entrance surface, but rather is condensed. This results in the formation of an intermediate focus within the Kepler axicon. In order that this intermediate focus does not destroy the Kepler axicon, its maximum intensity $I_{max}$ has to be lower than the threshold intensity for permanent damage to the material of the Kepler axicon. The maximum intensity $I_{max}$ of the intermediate focus can preferably be adjusted by means of the axicon angle of the entrance surface and the refractive index of the Kepler axicon. It is thereby possible to derive the following relation from the above-cited publication of Jarutis et al, 2000:

$$I_{max} = \frac{2 \cdot P \cdot 1.9 \cdot A''}{\pi \cdot W}, \text{ where } A'' = 2 \cdot \sin(\arcsin(n_a \sin\alpha_1) - \alpha_1).$$

Here, $n_a$ is the refractive index of the Kepler axicon and P is the pulse peak power of the laser beam, which, under the assumption of a rectangular laser pulse of time t can be estimated from the pulse energy $E_{pulse}$, where $P=E_{pulse}/t$. W is the half radial width of the Gaussian beam, characterized by the $1/e^2$ intensity decrease, directly prior to entry into the double axicon. The variable A" is an arbitrary quantity, which takes into account only the axicon parameter, the axicon angle $\alpha_1$, and the refractive index $n_a$.

Preferably, the one-piece double axicon is monolithic.

The term "monolithic" is understood to mean that the double axicon is fabricated from one piece and is not composed of various parts.

The monolithic construction of the axicon has the advantage that there are no refractive or reflective boundary surfaces in the axicon that interfere with the beam passage and reduce the Bessel fraction of the laser beam after it passes the entrance surface of the double axicon. In addition, the axicon has fewer degrees of freedom and therefore makes possible a simpler adjustment and is more robust toward shaking.

Advantageously, the monolithic double axicon has a refractive index $n_a$ between 1.35 and 1.9.

In an advantageous embodiment, the double axicon is composed of a first planar axicon and a second planar axicon.

Axicons are usually milled by means of CNC machines from a blank and subsequently post-polished. On account of their simpler geometry, planar axicons are therefore easier to produce.

Composing the double axicon from a first planar axicon and a second planar axicon allows the use of various planar-axicon combinations in terms of refractive indices and axicon angles and consequently a more effective beam guidance.

In another advantageous embodiment, the first planar axicon and the second planar axicon are connected to each other indirectly via an intermediate element or are connected directly to each other. The intermediate element is preferably in the shape of a plate.

The intermediate element can take on further beam-forming tasks. For example, the intensity profile of the laser beam along the line focus can be specified in advance by means of a refractive index $n(r)$ that depends on the radius r.

Preferably, the first planar axicon has a refractive index $n_1$ and the second planar axicon has a refractive index $n_2$, whereby the following relation holds: $n_1 = n_2$.

In another embodiment, the first planar axicon has a refractive index $n_1$ and the second planar axicon has a refractive index $n_2$, whereby the following relation holds: $n_1 \neq n_2$.

Through the use of two materials having different refractive indices, in particular when $n_1 > n_2$, it is possible to achieve steeper angles of impingement on the exit surface of the double axicon. The result of this is that the energy density of the line focus is increased, depending on the angle of impingement of the ring beam on the exit surface of the double axicon. In addition, a narrower line focus is created for a more precise processing of the workpiece.

In another preferred embodiment, at least one of the two planar axicons has a refractive index that exhibits a radial dependence.

By means of a suitable radial dependence of one of the refractive indices, the intensity distribution of the line focus can be adapted in such a way that it deviates from the intensity distribution of a Bessel-Gaussian beam.

Further preferably, the intermediate element has a refractive index $n_z$ between 1.35 and 1.9.

In a preferred embodiment, the refractive index $n_z$ of the intermediate element exhibits a radial dependence.

As already explained above, it is possible by means of a radially dependent refractive index to adapt the intensity distribution of the line focus in such a way that it deviates from the intensity distribution of a Bessel-Gaussian beam.

Advantageously, after it passes the optical device, the ring beam has an aperture angle $\beta$ with $5° \leq \beta \leq 20°$.

The aperture angle $\beta$ is dependent on the refractive index $n_a$ of the double axicon as well as on the two axicon angles $\alpha_1$ and $\alpha_2$.

For a Galileo axicon, there exists the following relation:

$$\beta_G = \arcsin\left(n_a \sin\left\{\arcsin\left(\frac{\sin \alpha_1}{n_a}\right) - \alpha_1 + \alpha_2\right\}\right) - \alpha_2$$

For a Kepler axicon, there exists the following relation:

$$\beta_K = \arcsin\left(n_a \sin\left\{\arcsin\left(\frac{\sin \alpha_1}{n_a}\right) + \frac{\pi}{2} - \alpha_1 - \alpha_2\right\}\right) - \alpha_2$$

It was found that, for aperture angles $\beta > 20°$, too many diffraction rings are formed, resulting in a reduction of the power in the central maximum of the line focus, which, in turn, leads to a substantial degradation in the effectiveness of the energy absorption in the workpiece.

In a preferred embodiment, the exit surface of the optical device is part of a lens for focusing the ring beam.

In particular, the lens is preferably designed as a convergent lens or as an axicon.

Lenses offer, in particular, the advantage of further beam formation and can be used for the purpose of either lengthening or shortening the line focus, depending on the case of application, or for the purpose of an intensity distribution that deviates from a Gaussian-Bessel intensity distribution.

The object is also achieved with a method as described herein for laser-based separation of a transparent, brittle workpiece.

In the method, a laser beam of a pulsed laser with a wavelength $\lambda$ is directed onto the workpiece in order to process it, wherein, by means of an optical device that is positioned in the beam path, the laser beam creates a line focus having a length $L_f$ behind the optical device and wherein the workpiece is positioned in such a way that the line focus lies at least in part in the workpiece and wherein a device as described above is used.

With the use of the previously described device, appreciably longer intensity profiles along the line focus are achieved and are responsible for a higher edge quality of the processed workpiece.

Beyond this, the processing quality is less sensitive to variations in the distance between the optics and the workpiece.

Transparent, brittle materials are preferably glass, glass ceramics, sapphire, and crystalline materials, such as, for example, those made of silicon. However, the processing of transparent plastics is also possible.

Preferably, the workpiece is positioned in such a way in relation to the device that the maximum intensity $I_{max}$ lies in the workpiece.

It is further preferred that the maximum intensity $I_{max}$ is adjusted in such a way that the maximum intensity $I_{max}$ is higher than the threshold intensity $I_S$ of the material of the workpiece.

Preferably, the length $L_f$ of the line focus is adjusted in such a way that $L_f$ is less than the thickness of the workpiece.

This design is then preferably utilized when $I_{max}/2$ is higher than the threshold intensity $I_s$ of the material of the workpiece. In addition, it has the advantage that the power of the laser can be adjusted in such a way that no damage occurs on the surfaces of the workpiece.

Preferably, the length $L_f$ of the line focus is adjusted in such a way that the length $L_f$ is greater than the thickness of the workpiece. This design is preferably utilized when $I_{max}/2$ is lower than the threshold intensity $I_s$ of the material of the workpiece. In this embodiment, it is ensured, in addition, that the processing quality is less sensitive to variations in the distance between the optics and the workpiece.

Preferably, the line focus is adjusted in such a way and the workpiece is positioned in such a way that at least one of the two opposite-lying surfaces of the workpiece is crossed by the line focus. This design is preferably utilized when $I_{max}/2$ is about the same magnitude as the threshold intensity $I_S$, and the slightly asymmetric intensity distribution of the Gaussian-Bessel focus along the line of focus or an intensity distribution that deviates from it has consequences on the modification in the workpiece. In addition, it may be advantageous here to exploit the fact that the power of the laser can be adjusted in such a way that, on one side of the workpiece, no damage occurs, while, on the other side, the processing quality is less sensitive to variations in the distance between the optics and the workpiece.

Advantageously, a laser whose laser beam has a pulse energy $E_P$ of 50 μJ to 10 mJ before the entrance surface is utilized. Especially preferred is an energy $E_P$ of 500 μJ to 5 mJ. This preferred range of values is chosen, in particular, when the length $L_f$ of the line focus is greater than 3 mm.

Moreover, after leaving the laser, the wavelength λ of the laser beam is preferably 0.2 to 20 μm. Especially preferred is a wavelength λ of 0.4 to 11 μm.

The pulse duration $D_P$ of the laser beam is advantageously 0.1 to 100 ps. Especially preferred is a pulse duration $D_P$ of 5 to 15 ps.

One embodiment, the present disclosure provides a device for the laser-based separation of a transparent, brittle workpiece, having a laser, which emits a laser beam with an intensity $I_L$ along an optical axis, and an optical device. The optical device has at least one one-piece double axicon. The double axicon has an entrance surface and the optical device has an exit surface. The entrance surface is designed in such a way that a ring beam is formed in the double axicon. The intensity $I_L$ in the double axicon is less than the threshold intensity $I_S$ of the material of the double axicon. The exit surface is such that a line focus having a maximum intensity $I_{max}$ and a length $L_f$ arises in the direction of the laser beam behind the exit surface.

In another embodiment, the present disclosure provides a method for the laser-based separation of a transparent, brittle workpiece, comprising the step of directing a laser beam of a pulsed laser with a wavelength λ onto the workpiece for the processing thereof. With an optical device that is positioned in the beam path of the laser, the laser beam creates a line focus having a length $L_f$ behind the optical device. The workpiece is positioned so that the line focus lies at least in part in the workpiece. The method is carried out with a device according to the previous paragraph.

DETAILED DESCRIPTION OF THE DISCLOSURE

Figure 1:
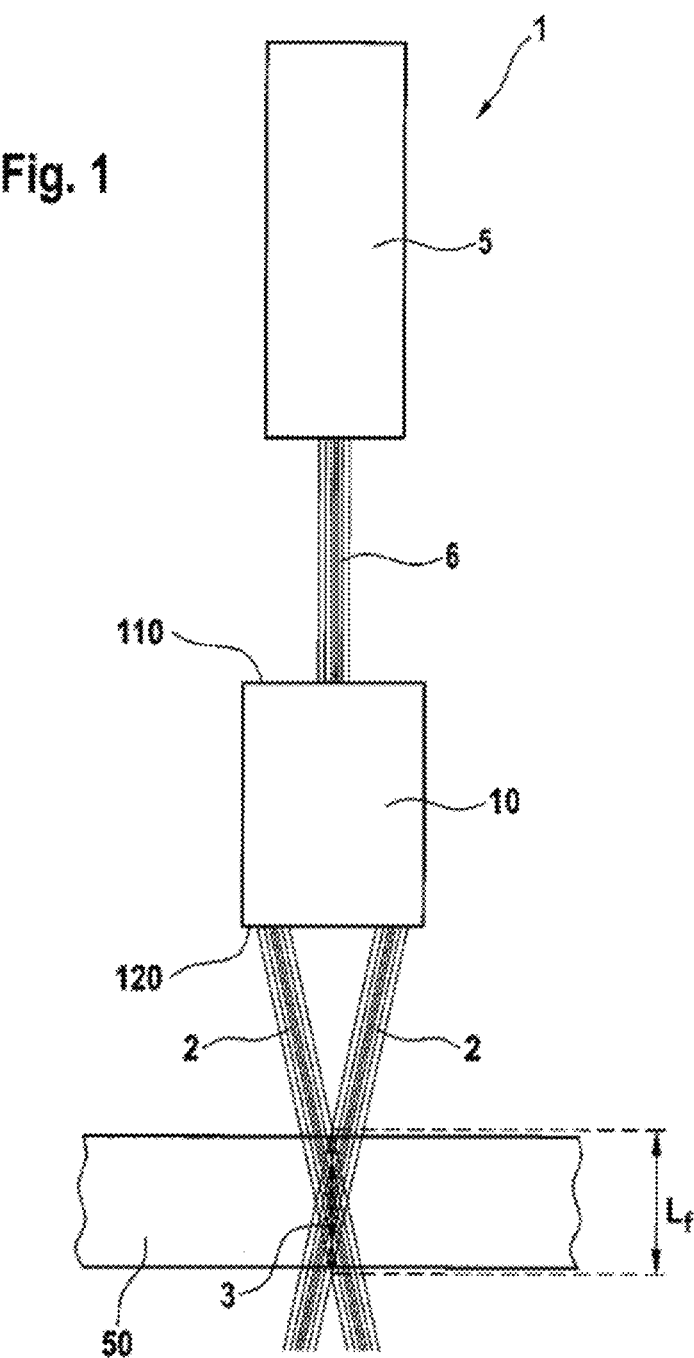
FIG. 1 is a schematic illustration of a device for the separation of a transparent, brittle workpiece.

In FIG. 1, a device 1 for the separation of a transparent, brittle workpiece 50 is depicted schematically. The device 1 comprises a laser 5, which emits a laser beam 6 in the form of a Gaussian beam along the optical axis P. In the beam path of the laser beam 6, there is an optical device 10 with an entrance surface 110 and an exit surface 120. The optical device 10 transforms the original Gaussian beam 6 into a ring beam 2, which is focused in a line focus 3 having a length $L_f$. For the processing of the workpiece 50, the line focus 3 is situated completely in the workpiece 50. In the following depictions, the design of the optical device 10 will be addressed in detail.

Figure 2:
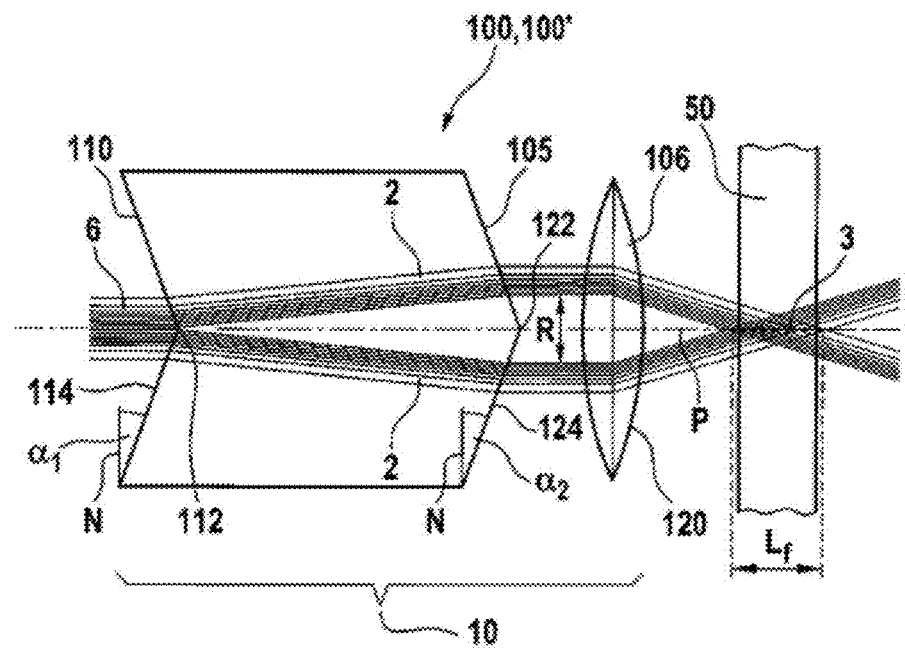
FIG. 2 depicts an optical device with a Galileo axicon and a convergent lens.

FIG. 2 shows the optical device 10 with the workpiece 50. In this embodiment, the optical device 10 is composed of a monolithic double axicon 100, which is designed as a Galileo axicon 100', and a convergent lens 106. The exit surface of the convergent lens 106 forms the exit surface 120 of the optical device 10.

The Galileo axicon 100' has a conical entrance surface 110 and a conical exit surface 105. Both the tip 112 of the entrance surface 110 and the tip 122 of the exit surface 105 are directed along the direction of propagation of the laser beam 6 and lie on the optical axis P. The Galileo axicon 100' has a first axicon angle $\alpha_1$ and a second axicon angle $\alpha_2$, whereby, in the present example, the two angles are the same in size. The axicon angle $\alpha_1$ or the axicon angle $\alpha_2$ is the angle between the conical surface 114 or 124, respectively, and the normal line N to the cone axis of the conical shape created by the entrance surface 110 and exit surface 105 of the double axicon 100, whereby the normal line N is oriented perpendicularly to the optical axis P.

The laser beam 6, which is emitted from a high-power laser 5 (see FIG. 1) as a Gaussian beam 6, spreads out along the optical axis P and is refracted at the entrance surface 110 of the Galileo axicon 100' in accordance with the law of refraction toward the perpendicular of the entrance surface 110, because a transition from an optically less dense medium to an optically more dense medium takes place. On account of the conical shape of the entrance surface 110, the laser beam 6 splits apart and a ring beam 2 with an inner radius R is formed in the interior of the Galileo axicon 100'. The inner radius R of the ring beam 2 is dependent on the axicon angle $\alpha_1$, the refractive index $n_a$ of the Galileo axicon 100', and the path traversed within the Galileo axicon 100'.

When it impinges on the exit surface 105 of the Galileo axicon 100', the ring beam 2 is refracted away from the perpendicular of the exit surface 105 in accordance with the law of refraction, because the ring beam 2 undergoes a transition from the optically more dense medium to the optically less dense medium. If the axicon angles $\alpha_1$ and $\alpha_2$ are identical, as in the present example, then the ring beam 2 is refracted in such a way that, after exiting from the Galileo axicon 100', it has a constant radius R.

By means of a convergent lens 106, the ring beam 2 is focused behind the Galileo axicon 100' into a line focus 3 having a length $L_f$. The line focus 3 penetrates completely through the workpiece 50.

Figure 3:
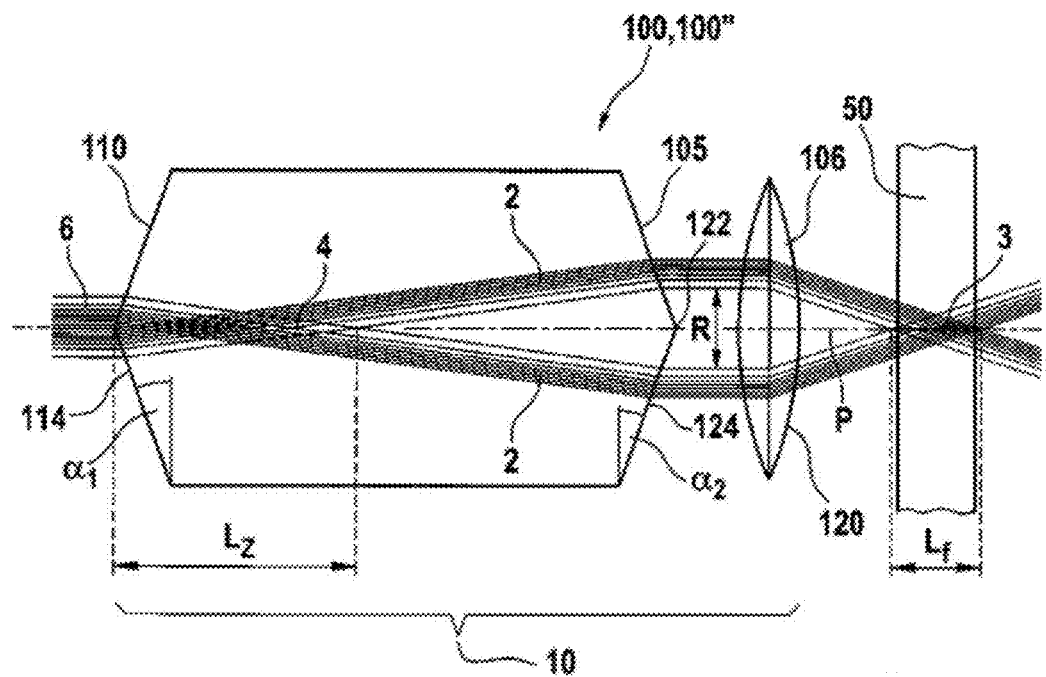
FIG. 3 depicts an optical device with a Kepler axicon and a convergent lens.

FIG. 3 shows the optical device 10 with a workpiece 50. In this embodiment, the optical device 10 is composed of a monolithic double axicon 100, which is designed as a Kepler axicon 100', and a convergent lens 106. The exit surface of the convergent lens 106 forms the exit surface 120 of the optical device 10.

The Kepler axicon 100" has a conical entrance surface 110 and a conical exit surface 105. The tip 112 of the entrance surface 110 is directed opposite to the direction of propagation of the laser beam 6 and the tip 122 of the exit surface 105 is directed along the direction of propagation of the laser beam 6. Both of the tips lie on the optical axis P.

The Kepler axicon 100" has a first axicon angle $\alpha_1$ and a second axicon angle $\alpha_2$, whereby, in the present example, the two angles are the same size. The axicon angle $\alpha_1$ and the axicon angle $\alpha_2$, respectively, are thereby the angles between the conical surfaces 114 and 124, respectively, and the normal line N to the cone axis of the conical shape formed by the entrance surface 110 and the exit surface 105 of the double axicon 100, whereby the normal line N is oriented perpendicularly to the optical axis P.

The laser beam 6 from the high-power laser 5 (see FIG. 1), which is emitted as a Gaussian beam 6, spreads out along the optical axis P and is refracted at the entrance surface 110 of the Kepler axicon 100" in accordance with the law of refraction toward the perpendicular of the entrance surface 112, because a transition from an optically less dense medium to an optically more dense medium takes place. On account of the conical shape of the entrance surface 110, the laser beam 6 is condensed in the interior of the Kepler axicon 100", resulting in a beam superimposition, whereby an intermediate focus 4 having a length $L_z$ is created in the interior of the Kepler axicon 100". Formed behind the intermediate focus 4, as in the case of the Galileo axicon 100', is a ring beam 2, the inner radius R of which is also dependent on the axicon angle $\alpha_1$, the refractive index $n_a$ of the Kepler axicon 100", and the path traversed in the Kepler axicon 100".

When it impinges on the exit surface 105 of the Kepler axicon 100", the ring beam 2 is refracted away from the perpendicular of the exit surface 105 in accordance with the law of refraction, because the ring beam 2 undergoes a transition from the optically denser medium to the optically less dense medium. If the axicon angles $\alpha_1$ and $\alpha_2$ are identical, as in the present example, then the ring beam 2 is refracted in such a way that, after exiting from the Kepler axicon 100", it has a constant inner radius R.

As in the case of the above-described Galileo axicon 100' (see also FIG. 2), by means of a convergent lens 106, the ring beam 2 is focused behind the Kepler axicon 100" into a line focus 3 having a length $L_f$. The line focus 3 penetrates completely through the workpiece 50.

Figure 4:
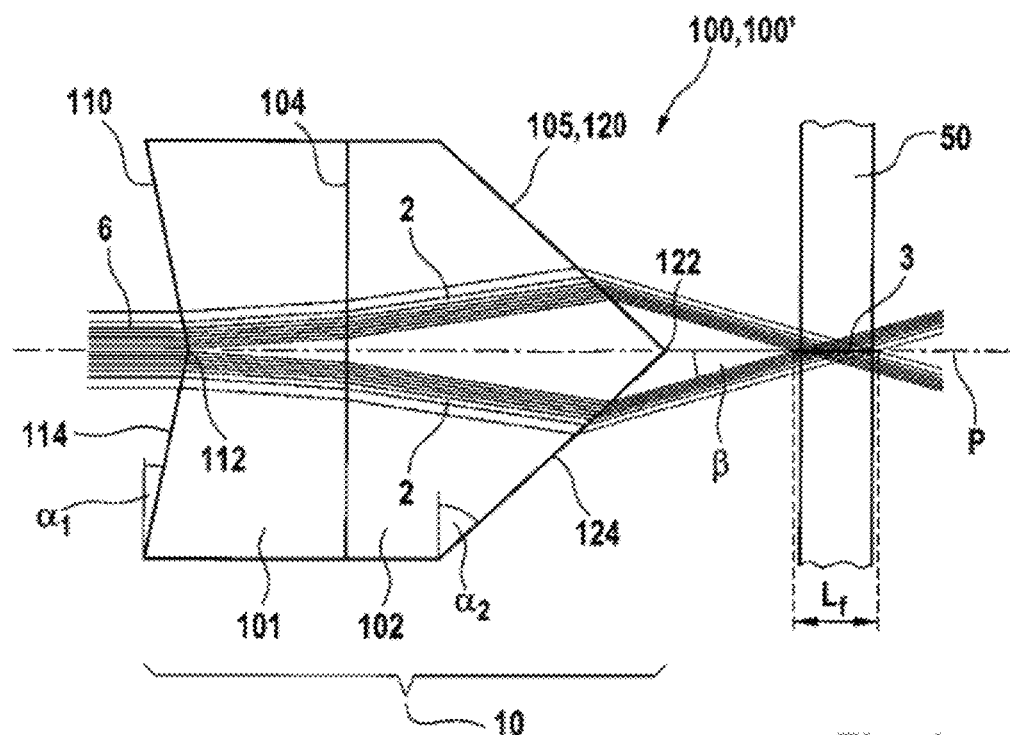
FIG. 4 depicts an optical device with a Galileo axicon that is composed of two planar axicons having different refractive indices.

FIG. 4 shows an optical device 10, which is designed as a Galileo axicon 100' that is composed of a first planar axicon 101 with a refractive index $n_1$ and a second planar axicon 102 with a refractive index $n_2$, whereby, in the example presented here, the refractive index $n_1$ is higher than the refractive index $n_2$. The two planar axicons 101, 102 are connected by being cemented to each other. The first planar axicon 101 has an axicon angle $\alpha_1$ and the second planar axicon 102 has an axicon angle $\alpha_2$, where $\alpha_1$ is smaller than $\alpha_2$. The conical surface 114 of the first planar axicon 101 forms the entrance surface 110 of the Galileo axicon 100', while the conical surface 124 of the second planar axicon 102 forms both the exit surface 105 of the Galileo axicon 100' and the exit surface 120 of the optical device 10.

The Gaussian beam 6 that impinges on the entrance surface 110 of the Galileo axicon 100' is split at the entrance surface 110 into a ring beam 2, the inner radius R of which becomes larger with progressive traversed path in the first planar axicon 101. At a boundary surface 104 between the first planar axicon 101 and the second planar axicon 102, the ring beam 2 is refracted once again. Because the refractive index $n_1$ of the first planar axicon 101 is higher than the refractive index $n_2$ of the second planar axicon 102, the ring beam 2 is further spread apart.

When it impinges on the exit surface 105 of the Galileo axicon 100', the ring beam 2 is recombined at an aperture angle β and, at the site of superimposition, creates a line focus 3 having a length $L_f$. The workpiece 50 is arranged in this line focus $L_f$ for the processing thereof.

Figure 5:
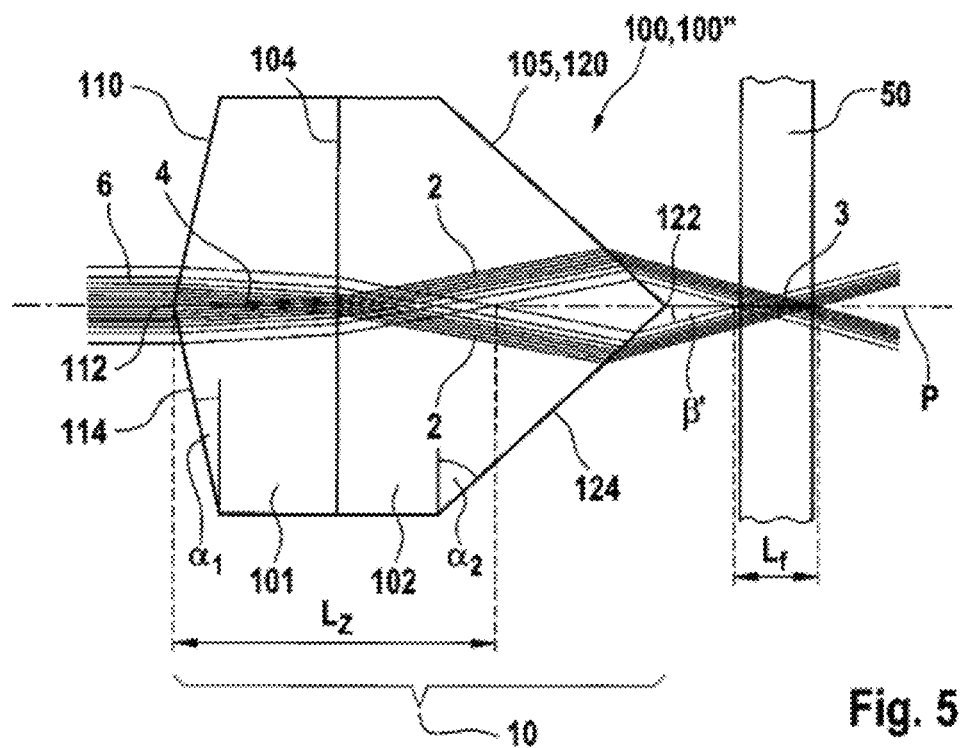
FIG. 5 depicts an optical device with a Kepler axicon that is composed of two planar axicons having different refractive indices.

FIG. 5 shows an optical device 10, which is designed as a Kepler axicon 100" that is composed of a first planar axicon 101 with a refractive index $n_1$ and a second planar axicon 102 with a refractive index $n_2$, whereby, in the example presented here, the refractive index $n_1$ is higher than the refractive index $n_2$. The first planar axicon 101 has an axicon angle $\alpha_1$ and the second planar axicon has an axicon angle $\alpha_2$, where $\alpha_1$ is smaller than $\alpha_2$. The conical surface 114 of the first planar axicon 101 forms the entrance surface 110 of the Kepler axicon 100", while the conical surface 124 of the second planar axicon 102 forms both the exit surface 105 of the Kepler axicon 100" and the exit surface 120 of the optical device 10.

The Gaussian beam that impinges on the entrance surface 110 of the Kepler axicon 100" is refracted at the entrance surface 110 and is concentrated in the Kepler axicon 100", on account of the cone tip 112 of the first planar axicon 101, which is oriented opposite to the direction of propagation, resulting in beam crossing and the creation of an intermediate focus 4 having the length $L_z$.

At the boundary surface 104, the laser beam 6 is refracted once again and, behind the intermediate focus 4, a ring beam 2 with the inner radius R is formed and becomes larger with progressive traversed path in the Kepler axicon 100". On account of the low refractive index $n_2$ of the second planar axicon 102, the ring beam 2 spreads out more strongly behind the intermediate focus 4. In this way, a steeper angle of impingement on the exit surface 105 of the Kepler axicon 100" is achieved than, for example, in the case of the monolithic Kepler axicon 100" that has the same dimensions. When it passes the exit surface 105 of the Kepler axicon 100", the ring beam 2 is recombined at an aperture angle β' and creates at the site of superimposition a line focus 3 having a length $L_f$.

A steep angle of impingement on the exit surface 105 leads to the fact that, behind the Kepler axicon 100", the ring beam 2 has a lesser ring thickness and consequently a higher energy density. During the superimposition of the ring beam 2 in the line focus 3, this leads to the fact that the line focus used for processing the workpiece 50 is shorter in comparison to that of a monolithic Kepler axicon 100" having the same dimensions, but has a higher energy density.

The intermediate focus 4 that is created in the Kepler axicon 100" has a length $L_z$, which is dependent on the refractive indices $n_1$ and $n_2$ as well as on the axicon angle $\alpha_1$ of the first planar axicon 101. In the present example, the intermediate focus 4 is about three times as long as the line focus 3 and accordingly has a markedly lower energy density.

Figure 6:
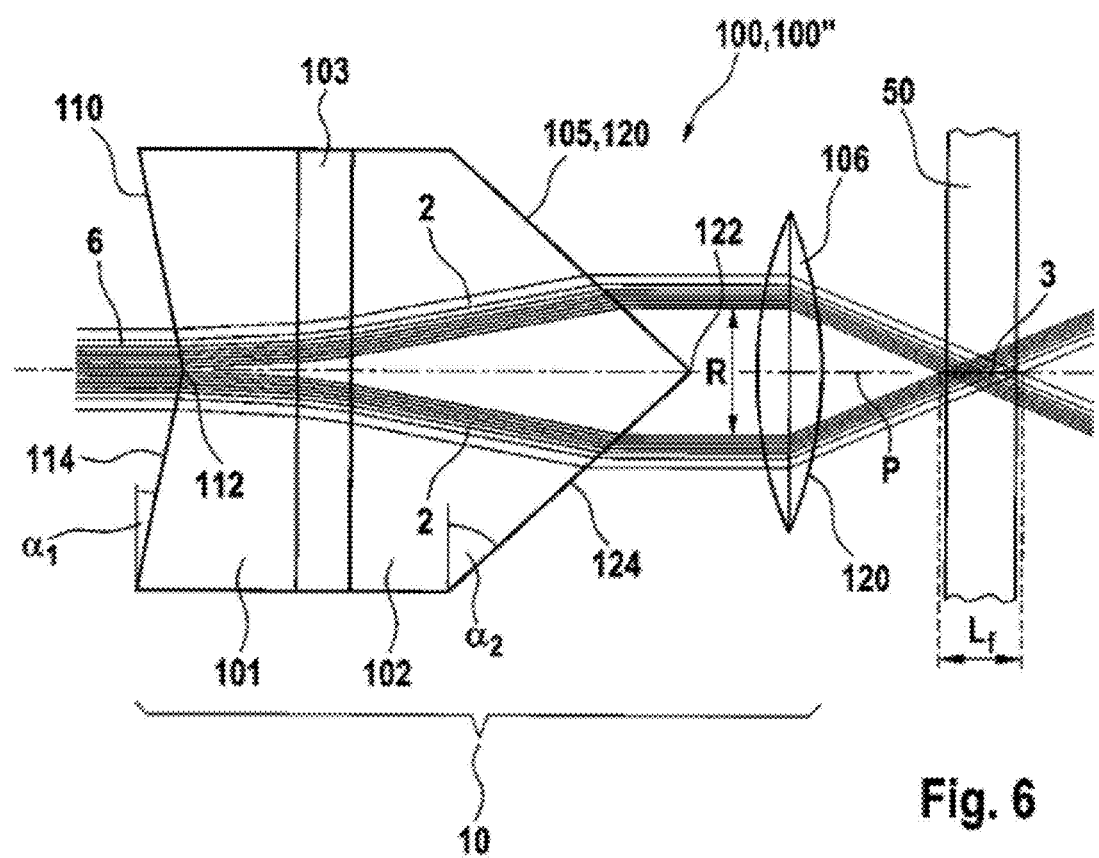
FIG. 6 depicts an optical device with a Galileo axicon that is composed of two planar axicons and an intermediate element.

FIG. 6 shows an optical device 10, which is designed as a Galileo axicon 100' that is composed of a first planar axicon 101 with a refractive index $n_1$ and a second planar axicon 102 with a refractive index $n_2$, whereby, in the example presented here, the refractive index $n_1$ is higher than the refractive index $n_2$, and, between the two planar axicons 101, 102, an intermediate element 103 with a refractive index $n_z$ is situated. The intermediate element 103 is cemented at its lateral faces to the planar faces of the two planar axicons 101, 102.

Preferably, the intermediate element 103 has a refractive index $n_z$ that exhibits a radial dependence, by way of which the intensity distribution of a line focus 4 that is to be generated in the workpiece can be adapted in such a way that it deviates from the intensity distribution of the Bessel-Gaussian beam. In FIG. 6 presented here, the refractive index $n_z$ of the intermediate element 103 was assumed to be constant for purposes of clarity of the beam guidance, wherein the following relation applies: $n_1 > n_z > n_2$.

The first planar axicon 101 has an axicon angle $\alpha_1$ and the second planar axicon has an axicon angle $\alpha_2$, where $\alpha_1$ is smaller than $\alpha_2$. The conical surface 114 of the first planar axicon 101 forms the entrance surface 110 of the Galileo axicon 100', while the conical surface 124 of the second planar axicon 102 forms both the exit surface 105 of the Galileo axicon 100' and the exit surface 120 of the optical device 10.

The Gaussian beam 6 that impinges on the entrance surface 110 of the Galileo axicon 100' is split at the entrance surface 110 into a ring beam 2, the inner radius R of which becomes with progressive traversed path in the first planar axicon 101. At the boundary surface to the intermediate element 103, the ring beam 2 is refracted once again. Because the refractive index $n_1$ of the first planar axicon 101 is greater than the refractive index $n_z$ of the intermediate element 103, the ring beam 2 is further spread apart. At the boundary surface between the intermediate element 103 and the second planar axicon 102, the Gaussian beam is refracted once again from the perpendicular of the boundary surface and further spread apart.

When it impinges on the exit surface 105 of the Galileo axicon 100', the ring beam 2 is refracted away from the perpendicular of the exit surface 105 in accordance with the law of refraction, because the ring beam 2 undergoes a transition from the optically denser medium to the optically less dense medium. In the illustrated exemplary embodiment, the axicon angles $\alpha_1$, $\alpha_2$ and the refractive indices $n_1$, $n_2$, $n_z$ are configured in such a way that the ring beam 2 is first focused by means of a convergent lens 106, which is arranged behind the Galileo axicon 100', into a line focus 3 having a length $L_f$. The line focus 3 penetrates completely through the workpiece 50.

Figure 7:
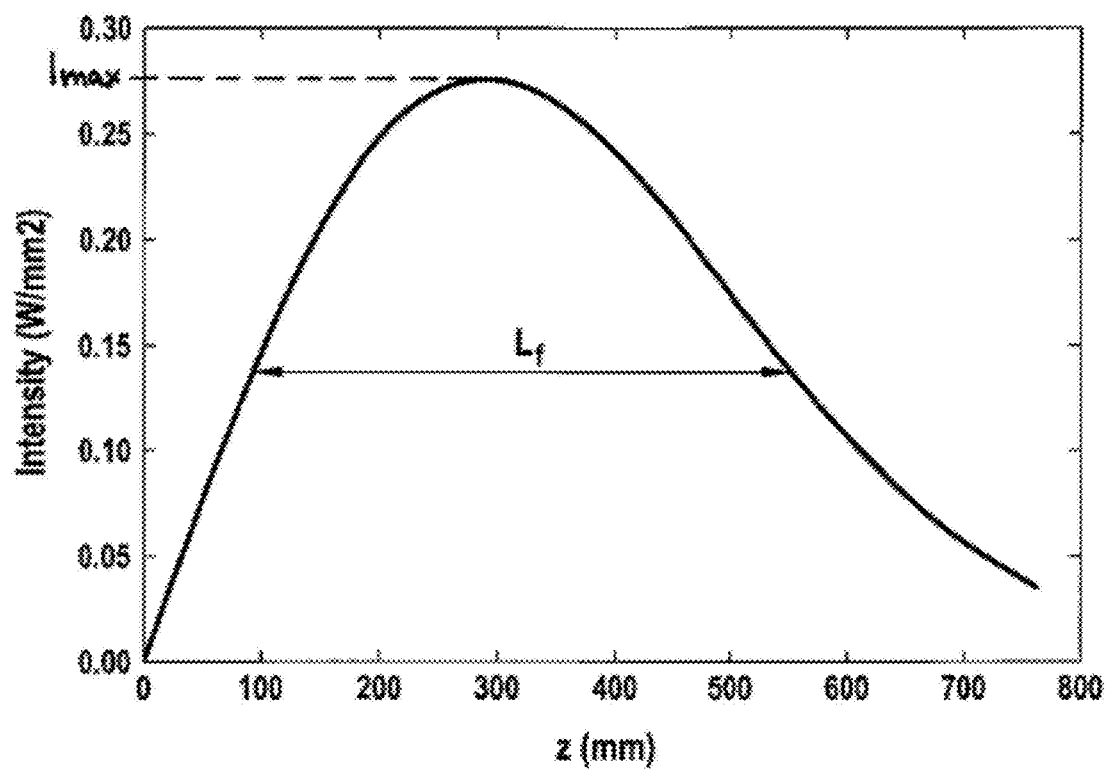
FIG. 7 depicts a line focus of a Bessel-Gaussian beam formed by means of a Galileo axicon.

By way of example, FIG. 7 shows the intensity distribution in the line focus 3 of a Galileo axicon 100' along the beam direction (z direction). The length $L_f$ of the line focus 3 corresponds to the width of the intensity distribution at half maximum intensity $I_{max}$.

The Gaussian beam 6 that is emitted from a laser has its intensity maximum in its radial center. On account of the fact that the Gaussian beam 6 fans out when it passes the Galileo axicon 100', the intensity maximum $I_{max}$ of the ring beam 2 is situated on its inner side and this leads to the fact that the line focus 3 has a higher intensity in the front region of the illustrated intensity distribution.

In the case of the Kepler axicon 100", in contrast, the intensity maximum is situated in the back region of the intensity distribution (not illustrated), because, on account of the beam crossing in the Kepler axicon 100", the maximum intensity $I_{max}$ of the ring beam 2 is situated on the outer side thereof.

LIST OF REFERENCE CHARACTERS 1 device
2 ring beam
3 line focus
4 intermediate focus
5 laser
6 laser beam, Gaussian beam
10 optical device
50 workpiece
100 double axicon
100' Galileo axicon
100" Kepler axicon
101 first planar axicon
102 second planar axicon
103 intermediate element
104 boundary surface
105 exit surface of the double axicon
106 convergent lens
110 entrance surface
112 tip
114 conical surface
120 exit surface of the optical device 10
122 tip
124 conical surface
P optical axis
R inner radius of the ring beam
$\alpha_1$ first axicon angle
$\alpha_2$ second axicon angle
$\beta$, $\beta'$ aperture angle
$L_f$ length of the line focus
$L_z$ length of the intermediate focus
N normal line to the cone axis

What is claimed is:

1. A device for the laser-based separation of a transparent, brittle workpiece, comprising:
    a laser that emits a laser beam with an intensity $I_L$ along an optical axis, wherein the laser beam has a pulse energy of 500 microjoules to 5 millijoules; and
    an optical device,
    wherein the optical device has at least one double axicon,
    wherein the double axicon has an entrance surface and the optical device has an exit surface,
    wherein the laser beam splits into a ring beam after passing the entrance surface,
    wherein the intensity $I_L$ in the double axicon is less than a threshold intensity $I_S$ of the material of the double axicon,
    wherein the exit surface is such that a line focus having a maximum intensity $I_{max}$ being higher than a threshold energy of the workpiece and a length $L_f$ arises in a direction of the laser beam after the exit surface, and
    wherein, after the laser beam passes the optical device, the laser beam has an aperture angle $\beta$ with $5 \leq \beta \leq 20°$ and the maximum intensity $I_{max}$ lies in the workpiece.

2. The device according to claim 1, wherein the double axicon has an inwardly directed conical entrance surface and an outwardly directed conical exit surface.

3. The device according to claim 1, wherein the double axicon is a Kepler axicon.

4. The device according to claim 1, wherein the double axicon is monolithic.

5. The device according to claim 4, wherein the double axicon has a refractive index of $1.35 \leq n_a \leq 1.9$.

6. The device according to claim 1, wherein the double axicon is composed of a first planar axicon and a second planar axicon.

7. The device according to claim 6, wherein the first planar axicon and the second planar axicon are connected to each other indirectly via a transparent intermediate element or are connected directly to each other.

8. The device according to claim 7, wherein the intermediate element has a refractive index of $1.35 \leq n_z \leq 1.9$.

9. The device according to claim 8, wherein the refractive index $n_z$ of the intermediate element exhibits a radial dependence.

10. The device according to claim 6, wherein the first planar axicon has a refractive index $n_1$ and the second planar axicon has a refractive index $n_2$, wherein the following relation applies: $n_1 = n_2$.

11. The device according to claim 6, wherein the first planar axicon has a refractive index $n_1$ and the second planar axicon has a refractive index $n_2$, wherein the following relation applies: $n_1 \neq n_2$.

12. The device according to claim 11, wherein the refractive index $n_1$ and/or the refractive index $n_2$ exhibit or exhibits a radial dependence.

13. The device according to claim 1, wherein the exit surface of the optical device is part of a lens for focusing the ring beam.

14. The device according to claim 13, wherein the lens is a convergent lens or an axicon.

\* \* \* \* \*